United States Patent
Almedia et al.

(10) Patent No.: US 9,128,813 B2
(45) Date of Patent: Sep. 8, 2015

(54) METHOD AND DEVICE FOR ASSISTING A DRIVER WHILE DRIVING A VEHICLE BY DETECTING WEATHER-RELATED VISIBILITY LIMITATIONS

(75) Inventors: Carlos Almedia, Reinheim (DE); Martin Randler, Immenstaad (DE); Jochen Bauer, Lindau (DE)

(73) Assignee: Conti Temic Microelectronic GmbH (DE)

( * ) Notice: Subject to any disclaimer, the term of this patent is extended or adjusted under 35 U.S.C. 154(b) by 280 days.

(21) Appl. No.: 13/640,516

(22) PCT Filed: Apr. 5, 2011

(86) PCT No.: PCT/DE2011/000366
§ 371 (c)(1),
(2), (4) Date: Dec. 17, 2012

(87) PCT Pub. No.: WO2011/127895
PCT Pub. Date: Oct. 20, 2011

(65) Prior Publication Data
US 2013/0103257 A1 Apr. 25, 2013

(30) Foreign Application Priority Data
Apr. 16, 2010 (DE) .......................... 10 2010 015 214

(51) Int. Cl.
*B60S 1/08* (2006.01)
*G06F 17/00* (2006.01)
*B60Q 1/14* (2006.01)
*B60Q 1/20* (2006.01)

(52) U.S. Cl.
CPC ................ *G06F 17/00* (2013.01); *B60Q 1/143* (2013.01); *B60Q 1/20* (2013.01); *B60S 1/0844* (2013.01); *B60Q 2300/312* (2013.01)

(58) Field of Classification Search
CPC .............. B60W 10/30; B60W 2550/12; B60S 1/00–1/548; B60S 1/0844; B60Q 1/08–1/085; B60Q 1/143; B60Q 1/20; B60Q 2300/312
USPC ............... 701/36, 45, 48, 49, 1; 340/601–604
See application file for complete search history.

(56) References Cited

U.S. PATENT DOCUMENTS 5,923,027 A * 7/1999 Stam et al. ................. 250/208.1
6,313,454 B1 * 11/2001 Bos et al. ................... 250/208.1
(Continued)

FOREIGN PATENT DOCUMENTS

DE          695 04 761 T2    4/1999
DE    10 2004 015 040 A1    10/2005
(Continued)

OTHER PUBLICATIONS

International Preliminary Report corresponding to application No. PCT/DE2011/000366, dated Oct. 16, 2012.
(Continued)

Primary Examiner — Helal A Algahaim
Assistant Examiner — Genna Mott
(74) Attorney, Agent, or Firm — RatnerPrestia

(57) ABSTRACT

The invention relates to a method for assisting a driver in driving a vehicle by detecting weather-related visibility limitations, wherein image data of the surroundings of the vehicle and of the windshield are generated by a camera that is directed toward the windshield.

12 Claims, 2 Drawing Sheets

(56) References Cited

U.S. PATENT DOCUMENTS

| | | | |
|---|---|---|---|
| 6,353,392 B1 | 3/2002 | Schofield et al. | |
| 7,361,875 B2 | 4/2008 | Bechtel | |
| 7,460,161 B2 | 12/2008 | Pallaro et al. | |
| 7,646,889 B2 | 1/2010 | Tsukamoto | |
| 2005/0035926 A1* | 2/2005 | Takenaga et al. | 345/8 |
| 2007/0047948 A1 | 3/2007 | Tanida | |
| 2007/0115357 A1* | 5/2007 | Stein et al. | 348/148 |
| 2007/0227718 A1* | 10/2007 | Hill et al. | 165/231 |

FOREIGN PATENT DOCUMENTS

| | | |
|---|---|---|
| DE | 10 2004 037 871 A1 | 3/2006 |
| DE | 603 05 124 T2 | 9/2006 |
| DE | 10 2006 016 774 A1 | 10/2006 |
| DE | 698 36 344 T2 | 5/2007 |
| DE | 10 2007 035 905 A1 | 2/2009 |
| EP | 1 790 541 A2 | 5/2007 |
| JP | 2003524545 | 8/2003 |
| JP | 2005-225250 | 8/2005 |
| JP | 2006349637 | 12/2006 |
| JP | 2007060158 | 3/2007 |
| WO | WO 2004/007255 A2 | 1/2004 |
| WO | WO 2006/024247 A1 | 3/2006 |
| WO | WO 2011107116 A1 * | 9/2011 |

OTHER PUBLICATIONS

International Search Report for PCT International Application No. PCT/DE2001/000366 mailed Jul. 25, 2011.
German Search Report for Application No. DE 10 2010 015 214.5 mailed Jun. 6, 2011.

* cited by examiner

METHOD AND DEVICE FOR ASSISTING A DRIVER WHILE DRIVING A VEHICLE BY DETECTING WEATHER-RELATED VISIBILITY LIMITATIONS

CROSS REFERENCE TO RELATED APPLICATIONS

This application is the U.S. National Phase of PCT/DE2011/000366, filed Apr. 5, 2011, which claims priority to German Patent Application No. 10 2010 015 214.5, filed Apr. 16, 2010, the contents of such applications being incorporated by reference herein.

FIELD OF THE INVENTION

The invention relates to a method for assisting a driver in driving a vehicle by, detecting weather-related visibility limitations, wherein image data of the surroundings of the vehicle and of the windshield are generated by a camera that is directed toward the windshield and a method for assisting a driver in driving a vehicle by detecting weather-related visibility limitations, wherein image data of the surroundings of the vehicle are generated by a camera that is directed toward the windshield. Furthermore, the invention relates to a device for carrying out the inventive method.

BACKGROUND OF THE INVENTION

Nowadays, rain sensors are widely used for the automatic control of windshield wipers in motor vehicles. Such a rain sensor is based on, e.g., an optoelectronic measurement by means of a light emitting diode (LED) as a light source and a detecting photodiode, wherein the physical laws of reflection at the interface between a material with a higher refractive index and a material with a lower refractive index are made use of.

There are also other operational principles for realizing a rain sensor. For example, the change of the capacitance of a rain-moistened electric capacitor may be used.

Furthermore, systems that generate images of the windshield of a vehicle by means of a camera are used, wherein image processing systems evaluate said images with regard to raindrops on the outer surface of the windshield or with regard to condensate on the inner surface of the windshield.

For example, WO 2004/007255 A2, which is incorporated by reference, describes a system with a video camera. By means of said video camera, moisture on a windshield of a vehicle can be detected. To this end, at least one image is acquired after focusing the optical system of the video camera on the region of the windshield surface. The image data of said image are analyzed for moisture on the assumption that raindrops can be identified as circular objects in the image data, whereas precipitation on the outer surface of the windshield caused by fog can be detected on the basis of the scattering of light coming from outside the vehicle.

DE 102004037871 B4, which is incorporated by reference, shows a camera system for an assistance system, said assistance system covering the region outside a motor vehicle in the direction of motion of the motor vehicle, i.e., the region in front of the motor vehicle. The far range (road scene) and the near range (windshield) are imaged onto an image sensor by installing a front lens in a part of the field of view in front of the objective lens of the vehicle camera. DE 102004037871 B4 proposes the use of an image sensor for an outside-region assistance function and rain functionality.

Furthermore, DE 698 36 344 T2, which is incorporated by reference, describes a rain sensor system with a camera, which system enables condensate on the inner surface of the windshield to be detected by means of an additional light source so that a windshield heater is switched on instead of a windshield wiper, for example.

For rain detection, according to DE 10 2006 016 774 A1, which is incorporated by reference, a camera focused to infinity is used and the image data are evaluated on the basis of a change of pixel intensities contained in the image relative to an average pixel intensity.

WO 2006/024247 A1, which is incorporated by reference, too describes a method for the detection of precipitation on a windshield, wherein a camera is focused to infinity so that an out-of-focus image of the windshield is formed. Raindrops or condensate on the inner surface of the windshield cause a soft-focus effect. The definition of the image and/or the contrast differences between adjacent pixels are assessed, and the presence of precipitation on the windshield is inferred therefrom. Furthermore, for a situation in which the surroundings of the vehicle is poor in contrast, said publication proposes acquiring a first image in a first step, activating a windshield wiper or a windshield heater in a second step, and acquiring a second image in a third step in order to assess the two images with regard to changes.

Finally, fog detection systems that are used to control fog lamps and rear fog lamps are also known. For example, according to DE 695 04 761 T2, which is incorporated by reference, an image of the surroundings is acquired by means of a camera, and the image data of said image are evaluated on the basis of a contrast analysis for the detection of fog.

BRIEF DESCRIPTION OF THE INVENTION

An aspect of the invention provides methods of the type mentioned at the beginning that are improved as against the state of the art, said methods assisting the driver in a better way, particularly if visibility is limited.

This is achieved by a method for assisting a driver in driving a vehicle by detecting weather-related visibility limitations, wherein image data of the surroundings of the vehicle and of the windshield are generated by a camera that is directed toward the windshield, wherein the camera comprises a bifocal optical element so that the camera is focused on the windshield in a first image region and focused on the surroundings of the vehicle in a second image region; at least one image is generated by the camera; for the detection of wetting of at least one of the inner and/or outer surface of the windshield with moisture and/or condensate, the image data of the first image region of the at least one image are evaluated by an image processing system and, in the event of a detection, a first evaluation signal that indicates wetting of the inner and/or outer surface of the windshield with moisture and/or condensate is generated; for the detection of a visibility limitation, due to fog and/or wetting of the inner and/or outer surface of the windshield with moisture and/or condensate, the image data of the second image region of the at least one image are evaluated by an image processing system and, in the event of a detection, a second evaluation signal that indicates the visibility limitation is generated; a control device is provided that activates a windshield wiper of the vehicle if the first and second evaluation signals have been generated, said windshield wiper wiping the windshield in the visual range of the camera, and that deactivates the windshield wiper after a predetermined period if the first and second evaluation signals are still present after the predetermined period, and that activates a windshield heater of the vehicle after deactivating the windshield wipers; and the control device activates at least one of a warning device of the vehicle, a fog lamp of the vehicle, and a rear fog lamp of the vehicle if only the second evaluation signal is present, as well as a method for assisting a driver in driving a vehicle by detecting weather-related visibility limitations, wherein image data of the surroundings of the vehicle are generated by a camera that is directed toward the windshield, wherein a rain sensor is provided, by which a first evaluation signal is generated if at least one of the inner and outer surface of the windshield is wetted with moisture and/or condensate; for the detection of a visibility limitation, due to fog and/or wetting of the inner and/or outer surface of the windshield with moisture and/or condensate, the camera is focused on the surroundings of the vehicle and at least one image is generated, wherein the image data of the at least one image of the surroundings of the vehicle are evaluated by an image processing system in order to generate a second evaluation signal that indicates the visibility limitation; a control device is provided that activates a windshield wiper of the vehicle if the first and second evaluation signals have been generated, said windshield wiper wiping the windshield in the visual range of the camera, and that deactivates the windshield wiper after a predetermined period if the first and second evaluation signals are still present after the predetermined period, and that activates a windshield heater of the vehicle after deactivating the windshield wipers; and the control device activates at least one of a warning device of the vehicle and/or a fog lamp of the vehicle and/or a rear fog lamp of the vehicle if only the second evaluation signal is present.

According to an aspect of the invention, a camera with a bifocal optical element is used for the detection of wetting of the inner and/or outer surface of the windshield with moisture and/or condensate or for the detection of a visibility limitation due to fog and/or wetting of the inner and/or outer surface of the windshield with moisture and/or condensate. In particular, the bifocal optical element may be a bifocal lens, a plane-parallel plate that is located only in one partial region (laterally) of the imaging beam path, or a continuous element with at least two partial regions of different thicknesses. The bifocal optical element causes the formation of a focused image of the windshield in a first image region of the camera and the simultaneous formation of a focused image of the surroundings of the vehicle in a second image region of the same camera.

At least one image is generated by the camera. For the detection of wetting of the inner and/or outer surface of the windshield with moisture and/or condensate, the image data of the first image region of the at least one image are evaluated by an image processing system.

In the event of a detection, a first evaluation signal that indicates wetting of the inner and/or outer surface of the windshield with moisture and/or condensate is generated.

For the detection of a visibility limitation due to fog and/or wetting of the inner and/or outer surface of the windshield with moisture and/or condensate, the image data of the second partial region of the at least one image are evaluated by an image processing system.

In the event of a detection, a second evaluation signal indicating the visibility limitation is generated. Finally, a control device is provided that activates a windshield wiper of the vehicle if first and second evaluation signals have been generated, said windshield wiper wiping the windshield in the visual range of the camera, and that deactivates the windshield wiper after a predetermined period and activates a windshield heater of the vehicle if the first and second evaluation signals are still present after the predetermined period, and that activates a warning device of the vehicle and/or a fog lamp of the vehicle and/or a rear fog lamp of the vehicle if only the second evaluation signal is present.

In this manner, and by means of only one system having a camera, one can advantageously detect a visibility limitation that affects the driver and is caused, e.g., by condensate on the inner surface of the windshield, by rain or damp on the outer surface of the windshield or by meteorological conditions, such as fog or rain, and immediately take the necessary measures, such as switching on a windshield wiper or a windshield heater and, when there is fog, activating safety functions, such as switching on a fog lamp and a rear fog lamp.

According to another aspect of the invention, a separate rain sensor (preferably on an optoelectronic basis) is provided, by means of which a first evaluation signal is generated if the inner and/or outer surface of the windshield is wetted with moisture and/or condensate. Furthermore, for the detection of a visibility limitation due to fog and/or wetting of the inner and/or outer surface of the windshield with moisture and/or condensate, at least one image is generated by means of a camera that is focused on the surroundings of the vehicle, wherein the image data of the at least one image of the surroundings of the vehicle are evaluated by an image processing system in order to generate a second evaluation signal that indicates the visibility limitation. Finally, a control device is provided that activates a windshield wiper of the vehicle if first and second evaluation signals have been generated, said windshield wiper wiping the windshield in the visual range of the camera, and that deactivates the windshield wiper after a predetermined period and activates a windshield heater of the vehicle if the first and second evaluation signals are still present after the predetermined period, and that activates a warning device of the vehicle and/or a fog lamp of the vehicle and/or a rear fog lamp of the vehicle if only the second evaluation signal is present.

One advantage of this method (aside from the ones mentioned above) consists in the fact that one can continue using the usual rain sensors (that work on an optoelectronic basis, for example) and just has to additionally use a camera that is focused to infinity. In many cases, such a camera is already available for assistance systems that observe the surroundings of a vehicle (lane detection, lateral and longitudinal control, road sign recognition, etc.). In particular, such a camera can be obtained at a low price.

When using a bifocal optical element, image regions with the surroundings of the vehicle and with the windshield are simultaneously obtained. For the detection of wetting of the windshield with moisture and/or condensate, a small image region (e.g., 10 percent of the overall camera image) is sufficient. Thus, it is also possible to supply the image data of the surroundings of the vehicle to a further image processing system in order to realize lane detection or road sign recognition, for example.

Likewise, in a further development of the inventive method, the image data of the surroundings of the vehicle acquired by the camera can be supplied to a further image processing system in order to realize lane detection or road sign recognition, for example.

According to a further development of the inventive methods, the focal length is permanently adjusted to infinity when acquiring images of the surroundings of the vehicle, which has proved to be particularly advantageous.

Finally, according to an advantageous further development of the inventive methods, the image data of the at least one image of the surroundings of the vehicle are evaluated by the image processing system on the basis of the contrast quality of the image data in order to generate a second evaluation signal that indicates the visibility limitation.

A device for carrying out the inventive methods is identified by a device for assisting a driver in driving a vehicle by detecting weather-related visibility limitations, wherein image data of the surroundings of the vehicle and of the windshield are generated by a camera that is directed toward the windshield, wherein the camera comprises a bifocal optical element so that the camera is focused on the windshield in a first image region and focused on the surroundings of the vehicle in a second image region; a control device is provided that activates the camera in such a manner that at least one image of the windshield and of the surroundings of the vehicle is generated, wherein the image data of the first image region of the at least one image are evaluated by an image processing system in order to generate a first evaluation signal that indicates wetting of at least one of the inner and outer surface of the windshield with moisture and/or condensate and wherein the image data of the second image region of the at least one image are evaluated by an image processing system in order to generate a second evaluation signal that indicates the visibility limitation; the control device activates a windshield wiper of the vehicle if the first and second evaluation signals have been generated, said windshield wiper wiping the windshield in the visual range of the camera, and that deactivates the windshield wiper after a predetermined period if the first and second evaluation signals are still present after the predetermined period, and that activates a windshield heater of the vehicle after deactivating the windshield wipers; and the control device activates at least one of a warning device of the vehicle, a fog lamp of the vehicle and a rear fog lamp of the vehicle if only the second evaluation signal is present or a device for assisting a driver in driving a vehicle by detecting weather-related visibility limitations, wherein image data of the surroundings of the vehicle are generated by a camera that is directed toward the windshield, wherein a rain sensor is provided, by which a first evaluation signal is generated if at least one of the inner and outer surface of the windshield is wetted with moisture and/or condensate; a control device is provided that activates the camera in such a manner that at least one image is generated in order to detect a visibility limitation, due to fog and/or wetting of the inner and/or outer surface of the windshield with moisture and/or condensate, wherein the image data of the at least one image of the surroundings of the vehicle are evaluated by an image processing system in order to generate a second evaluation signal that indicates the visibility limitation; the control device activates a windshield wiper of the vehicle if first and second evaluation signals have been generated, said windshield wiper wiping the windshield in the visual range of the camera, and that deactivates the windshield wiper after a predetermined period if the first and second evaluation signals are still present after the predetermined period, and that activates a windshield heater of the vehicle after deactivating the windshield wipers; and the control device activates at least one of a warning device of the vehicle, a fog lamp of the vehicle and a rear fog lamp of the vehicle if only the second evaluation signal is present. An advantageous further development of the inventive device can be inferred from a device wherein the rain sensor is designed as an optoelectronic sensor.

BRIEF DESCRIPTION OF THE DRAWINGS

The invention is best understood from the following detailed description when read in connection with the accompanying drawing. Included in the drawing is the following figure.

DETAILED DESCRIPTION OF THE INVENTION

Figure 1:
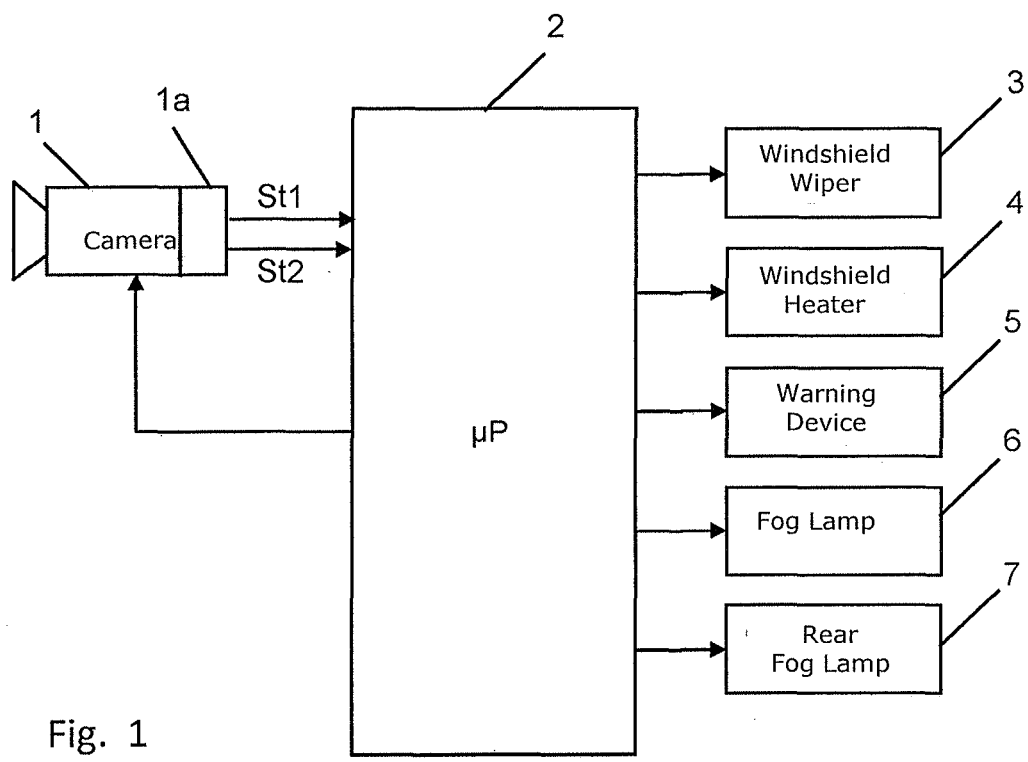
FIG. 1 shows a block diagram showing a schematic layout of a device for carrying out an exemplary embodiment of the inventive method.

The device shown in FIG. 1 is intended for installation in a vehicle. To this end, a camera 1 in the vehicle is directed toward the windshield of the vehicle and activated by a control device 2 (usually a microprocessor).

The camera 1 comprises a bifocal optical element (e.g., a bifocal lens) so that the camera 1 is focused on the windshield in a first image region and, at the same time, focused on the surroundings of the vehicle in a second image region. Preferably, the bifocal optical element may be designed and arranged in such a manner that the surroundings of the vehicle are imaged in the second image region with a focal length adjusted to infinity.

Such a camera 1 is activated by the control device 2 in such a manner that the camera 1 generates at least one image for the detection of wetting of the inner and/or outer surface of the windshield with moisture and/or condensate or for the detection of a visibility limitation due to, e.g., fog and/or wetting of the inner and/or outer surface of the windshield with moisture and/or condensate. For the generation of a first evaluation signal St1 (steps 300 and 304 of FIG. 3) that indicates wetting of the inner and/or outer surface of the windshield with moisture and/or condensate, the image data of the first image region of the at least one image are evaluated by an image processing system 1a. This image processing system 1a may also be a part of the control device 2.

Figure 3:
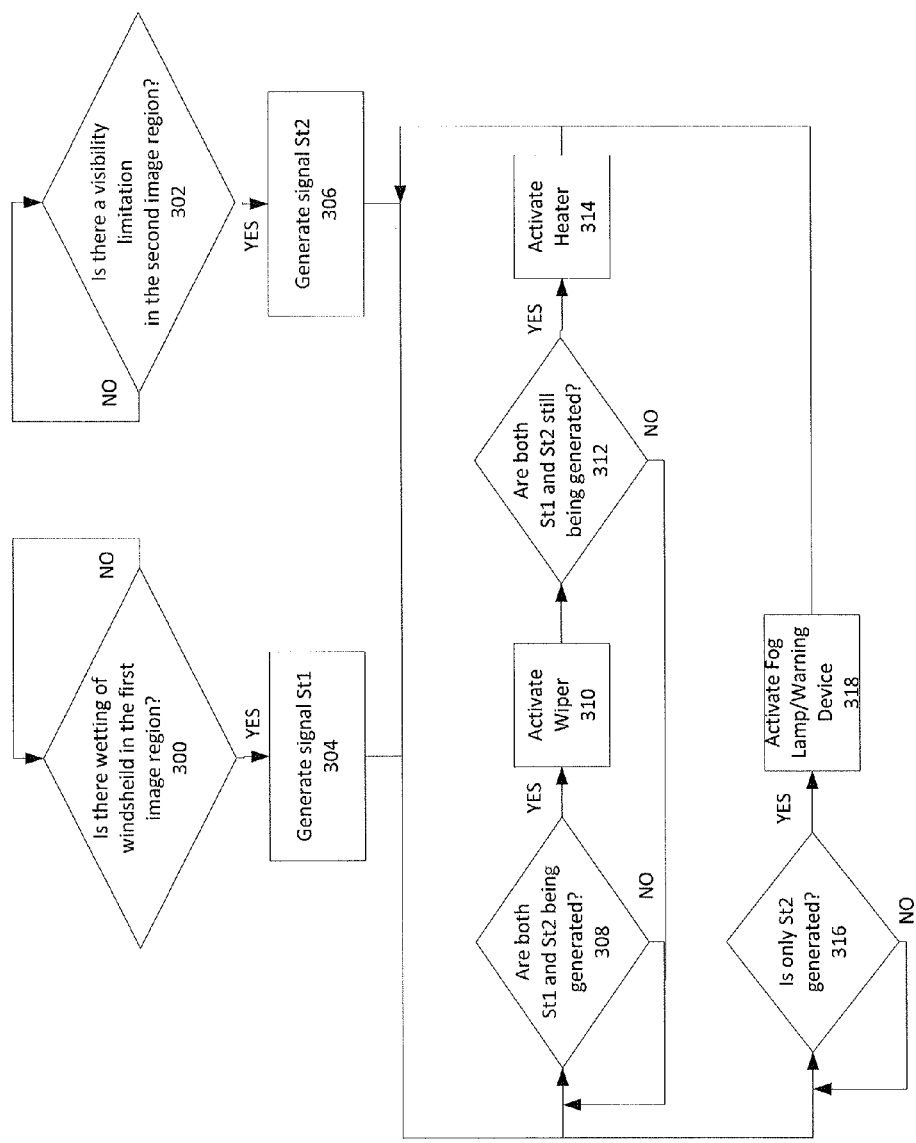
FIG. 3 shows a flow chart describing the operation of the devices in FIGS. 1 and 2 according to an embodiment of the inventive method.

Likewise, the image data of the second image region are evaluated (e.g., on the basis of the assessed contrast quality of the image data) by the image processing system 1a, and a second evaluation signal St2 is generated if a visibility limitation is detected (steps 302 and 306 of FIG. 3).

According to FIG. 1, the two evaluation signals St1 and St2 are evaluated by means of the control device 2. The evaluation may be realized by means of software or hardware.

If both the first evaluation signal St1 and the second evaluation signal St2 are present in step 316 of FIG. 3 (e.g., in the form of high-level signals), the control device 2 supplies a switch-on signal to a windshield wiper 3 of the vehicle step 318. This results in the windshield being wiped, particularly also in the region of the field of view of the camera 1.

After a predetermined period, the control device 2 checks whether both evaluation signals St1 and St2 are still present, wherein said period is calculated such that the windshield wiper wipes the windshield at least once and removes any moisture or condensate from the outer surface of the windshield. To this end, several wiping cycles might be necessary.

However, the generation of both evaluation signals St1 and St2 by the image processing system 1a even after this predetermined period indicates that the detected visibility limitation cannot be eliminated, i.e., that there is no wetness or moisture on the outer surface of the windshield but that there is condensate on the inner surface of the windshield. In this case, the control device 2 generates a switch-off signal for the windshield wiper 3 and a switch-on signal for a windshield heater 4 (step 318) so that the switched-on windshield heater 4 removes the condensate from the inner surface of the windshield and eliminates the visibility limitation that affects the driver.

However, if there is wetness or moisture on the windshield, the windshield is cleared by the wiping operation during the predetermined period. As a result of that, the image processing system generates neither an evaluation signal St1 nor an evaluation signal St2 so that the windshield wiper continues to be switched on or is cyclically activated by the control device 2 depending on the amount of rain.

If the image processing system 1a only generates a second evaluation signal St2, i.e., the image data of the second image region of the camera 1 indicate visibility limitations caused by, e.g., fog and/or wetting of the inner and/or outer surface of the windshield with moisture and/or condensate, whereas the image data in the first image region of the camera 1 do not indicate any visibility limitations, i.e., no wetting of the inner and/or outer surface of the windshield with moisture and/or condensate is detected, the visibility limitation detected by the camera 1 is presumably caused by fog.

In this manner, the device according to FIG. 1 detects fog with a high degree of certainty. As a result of that, the control device 2, activates a warning device 5 in order to warn the driver of fog, wherein the driver may be warned visually or acoustically. In addition, the fog lamps of the vehicle and/or the rear fog lamp 7 of the vehicle may be switched on.

Figure 2:
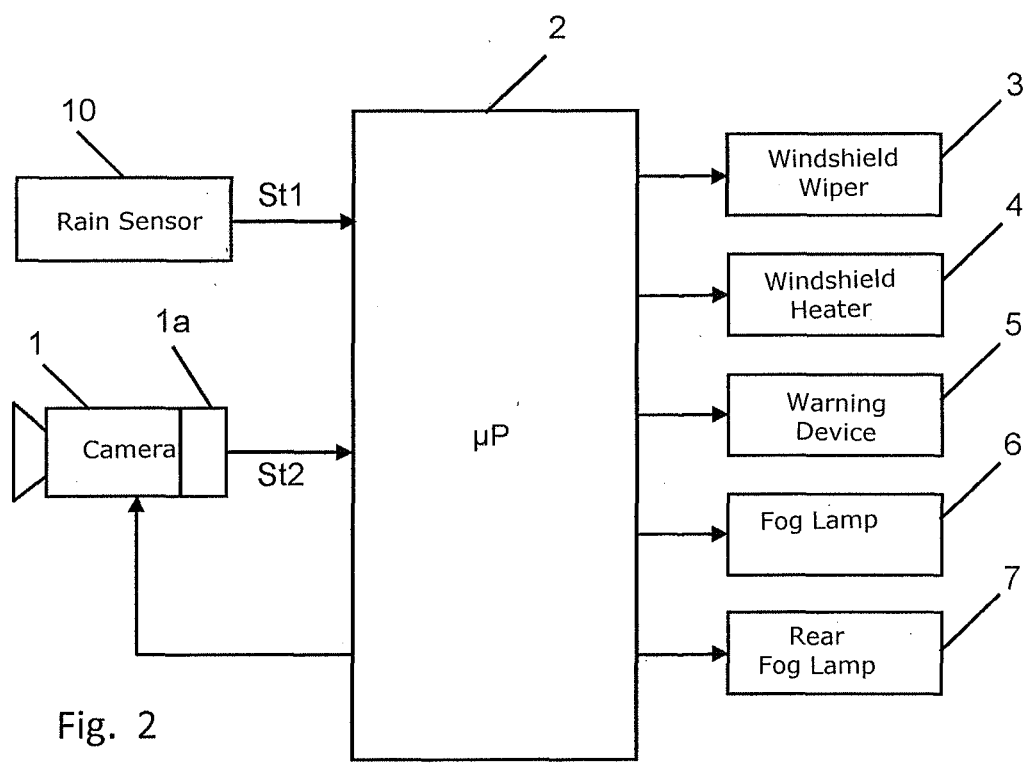
FIG. 2 shows a block diagram showing a schematic layout of a device for carrying out a further exemplary embodiment of the inventive method.

The difference between the device according to FIG. 2 and the device according to FIG. 1 consists in the fact that the device according to FIG. 2 has a rain sensor 10 of the usual type (e.g., on an optoelectronic basis) aside from the camera 1 activated by a control device 2. As against the camera 1 according to FIG. 1, the camera 1 according to FIG. 2 has no bifocal optical element but a uniform focal length that is permanently adjusted to infinity. Such cameras can be obtained on the market at a low price.

The rain sensor 10 supplies a first evaluation signal St1 to the control device 2 if said rain sensor 10 detects wetting of the inner and/or outer surface of the windshield with moisture and/or condensate.

The camera 1 having an image processing system 1a generates a second evaluation signal St2 if a visibility limitation caused by, e.g., fog and/or wetting of the inner and/or outer surface of the windshield with moisture and/or condensate is detected by evaluating the image data of the surroundings of the vehicle (likewise on the basis of the assessed contrast quality of the image data) by means of the image processing system 1a.

Aside from that, the mode of operation of said device according to FIG. 2 corresponds to that of the device according to FIG. 1.

REFERENCE NUMERALS 1 camera
1a image processing system of camera 1
2 control device, microprocessor
3 windshield wiper
4 windshield heater
5 warning device
6 fog lamp
7 rear fog lamp

The invention claimed is:

1. A method for assisting a driver in driving a vehicle by detecting weather-related visibility limitations, wherein image data of the surroundings of the vehicle and of a windshield of the vehicle are generated by a camera that is directed toward the windshield, including:

generating at least one image by the camera which includes a bifocal optical element so that the camera is focused on the windshield in a first image region and focused on the surroundings of the vehicle in a second image region;

detecting wetting of at least one of the inner and/or outer surface of the windshield with moisture and condensate, the image data of the first image region of the at least one image are evaluated by an image processing system and, in the event of a detection of wetting, a first evaluation signal that indicates wetting of the inner and/or outer surface of the windshield with moisture and/or condensate is generated;

detecting a visibility limitation, due to fog and/or wetting of the inner and/or outer surface of the windshield with moisture and/or condensate, the image data of the second image region of the at least one image are evaluated by the image processing system and, in the event of a detection of visibility limitation, a second evaluation signal that indicates the visibility limitation is generated; and 1) activating, by a control device, a windshield wiper of the vehicle to wipe the windshield in response to the first evaluation signal and the second evaluation signal both being generated, and then activate a windshield heater of the vehicle in response to the first evaluation signal and the second evaluation signal both still being generated after the wiper wipes the windshield, 2) activating, by the control device, a fog lamp of the vehicle and/or a driver warning device of the vehicle in response to only the second evaluation signal being generated.

2. The method according to claim 1, wherein the image data of the surroundings of the vehicle acquired by the camera are supplied to a further image processing system.

3. The method according to claim 1, wherein the image of the surroundings of the vehicle is acquired with a focal length that is adjusted to infinity.

4. The method according to claim 1, wherein the image data of the at least one image of the surroundings of the vehicle are evaluated by the image processing system on the basis of a contrast quality of the image data in order to generate a second evaluation signal that indicates the visibility limitation.

5. A method for assisting a driver in driving a vehicle by detecting weather-related visibility limitations, including:

generating, by a camera directed toward a windshield of the vehicle, image data of the surroundings of the vehicle, generating, by a rain sensor, a first evaluation signal if at least one of the inner and outer surface of the windshield is wetted with moisture and/or condensate, for a detection of a visibility limitation, due to fog and/or wetting of the inner and/or outer surface of the windshield with moisture and/or condensate, the camera is focused on the surroundings of the vehicle and at least one image is generated, wherein the image data of the at least one image of the surroundings of the vehicle are evaluated by an image processing system in order to generate a second evaluation signal that indicates the visibility limitation;

1) activating, by a control device, a windshield wiper of the vehicle to wipe the windshield in response to the first evaluation signal and the second evaluation signal both being generated, and then activate a windshield heater of the vehicle in response to the first evaluation signal and the second evaluation signal both still being generated after the wiper wipes the windshield;

2) activating, by the control device, a fog lamp of the vehicle and/or a driver warning device of the vehicle in response to only the second evaluation signal being generated.

6. The method according to claim 5, wherein the rain sensor is an optoelectronic sensor.

7. The method according to claim 5, wherein the image data of the surroundings of the vehicle acquired by the camera are supplied to a further image processing system.

8. The method according to claim 5, wherein the image of the surroundings of the vehicle is acquired with a focal length that is adjusted to infinity.

9. The method according to claim 5, wherein the image data of the at least one image of the surroundings of the vehicle are evaluated by the image processing system on the basis of the contrast quality of the image data in order to generate a second evaluation signal that indicates the visibility limitation.

10. A device for assisting a driver in driving a vehicle by detecting weather-related visibility limitations, including:
   a camera directed toward a windshield of the vehicle for generating an image data of the surroundings of the vehicle and of the windshield, the camera comprises a bifocal optical element so that the camera is focused on the windshield in a first image region and focused on the surroundings of the vehicle in a second image region; and
   a control device that activates the camera in such a manner that at least one image of the windshield and of the surroundings of the vehicle is generated, wherein the image data of the first image region of the at least one image are evaluated by an image processing system in order to generate a first evaluation signal that indicates wetting of at least one of the inner and outer surface of the windshield with moisture and/or condensate and wherein the image data of the second image region of the at least one image are evaluated by the image processing system in order to generate a second evaluation signal that indicates the visibility limitation;
   the control device is configured to:
   1) activate a windshield wiper of the vehicle to wipe the windshield in response to the first evaluation signal and the second evaluation signal both being generated, and then activate a windshield heater of the vehicle in response to the first evaluation signal and the second evaluation signal both still being generated after the wiper wipes the windshield,
   2) activate a fog lamp of the vehicle and/or a driver warning device of the vehicle in response to only the second evaluation signal being generated.

11. A device for assisting a driver in driving a vehicle by detecting weather-related visibility limitations, including:
   a camera that is directed toward a windshield, the camera generating image data of the surroundings of the vehicle;
   a rain sensor, by which a first evaluation signal is generated if at least one of the inner and outer surface of the windshield is wetted with moisture and/or condensate; and
   a control device that activates the camera in such a manner that at least one image is generated in order to detect a visibility limitation, due to fog and/or wetting of the inner and/or outer surface of the windshield with moisture and/or condensate, wherein the image data of the at least one image of the surroundings of the vehicle are evaluated by an image processing system in order to generate a second evaluation signal that indicates the visibility limitation;
   the control device is configured to:
   1) activate a windshield wiper of the vehicle to wipe the windshield in response to the first evaluation signal and the second evaluation signal both being generated, and then activate a windshield heater of the vehicle in response to the first evaluation signal and the second evaluation signal both still being generated after the wiper wipes the windshield,
   2) activate a fog lamp of the vehicle and/or a driver warning device of the vehicle in response to only the second evaluation signal being generated.

12. The device according to claim 11, wherein the rain sensor is an optoelectronic sensor.

* * * * *